United States Patent [19]

Nara

[11] Patent Number: 4,520,447

[45] Date of Patent: May 28, 1985

[54] SORTER WITH AUTOMATIC DISCHARGING UNIT

[75] Inventor: Seietsu Nara, Yokohama, Japan

[73] Assignee: Tokyo Shibaura Denki Kabushiki Kaisha, Kawasaki, Japan

[21] Appl. No.: 496,991

[22] Filed: May 23, 1983

[30] Foreign Application Priority Data

May 29, 1982 [JP] Japan .................................. 57-91698

[51] Int. Cl.$^3$ .......................... G06F 15/24; B07C 5/00

[52] U.S. Cl. .................................... 364/478; 209/564; 209/584; 209/900; 414/53

[58] Field of Search ................ 364/478; 209/900, 552, 209/559, 563, 564, 583, 584, 546, 569; 414/134, 135, 136, 51, 53

[56] References Cited

U.S. PATENT DOCUMENTS

| | | | |
|---|---|---|---|
| 4,051,957 | 10/1977 | Parups | 414/53 |
| 4,167,476 | 9/1979 | Jackson | 209/900 X |
| 4,181,948 | 1/1980 | Jackson et al. | 364/478 |
| 4,479,187 | 10/1984 | Nara | 364/478 |
| 4,482,059 | 11/1984 | Horii et al. | 209/569 |

*Primary Examiner*—Joseph Ruggiero

*Attorney, Agent, or Firm*—Cushman, Darby & Cushman

[57] ABSTRACT

A sorter with an automatic discharging unit has: a preliminary stacking section having a discharging mechanism for stacking therein paper sheets intended to be stacked in a given stacking section while paper sheets are being discharged from the given stacking section; a timer for counting a time interval corresponding to the ON operation of the preliminary stacking section with respect to the given stacking section and for producing a timeout signal when the predetermined time interval has elapsed; and a central processing unit for receiving the timeout signal from the timer so as to drive the discharging mechanism of the preliminary stacking section.

16 Claims, 6 Drawing Figures

SORTER WITH AUTOMATIC DISCHARGING UNIT

BACKGROUND OF THE INVENTION

The present invention relates to a sorter with an automatic discharging unit wherein sorting information printed on paper sheets (such as mail) is read to sort the paper sheets in corresponding stacking sections, and the paper sheets in each stacking section are automatically discharged and delivered to a subsequent process.

A sorter with an automatic discharging unit has recently been developed which will automatically discharge mail stacked in each stacking section and deliver it to a mailing address card issuing section and a bundling section. Automatic pushout mechanisms (not shown) are disposed in stacking sections b, c and d of a sorter main body a in FIG. 1. When a predetermined amount of postal matter A has been stacked in one of the stacking sections b, c and d, the stack of postal matter A is automatically pushed out in the backward direction by the corresponding automatic pushout mechanism and is transferred to a corresponding one of endless conveyor belts e, f and g which are disposed at the rear side of the sorter main body a and arranged in a vertical order corresponding to rows of stacking sections b, c and d. The stacks are then conveyed on the conveyor belts e, f and g in the horizontal direction. Thereafter, each stack is transferred to an elevator (not shown) and a conveying line (not shown). A mailing address card is then placed on each stack, which is then bundled.

In the case of discharging the postal matter A in a designated stacking section, subsequent postal matter A intended to be stacked in this designated stacking section is stacked in a preliminary stacking section h by a discharging mechanism while the stacked postal matter A in the designated stacking section is discharged, thereby avoiding rejection of the subsequent postal matter A.

However, in the apparatus described above, it is only when a predetermined amount of postal matter (e.g., 10 items) is stacked in the preliminary stacking section h that they are discharged therefrom. For this reason, the preliminary stacking section is exclusively used for the designated stacking section for a long period of time during which it cannot serve any other stacking section. As a result, the amount of rejected postal matter greatly increases, resulting in inconvenience.

SUMMARY OF THE INVENTION

It is an object of the present invention to provide a sorter with an automatic discharging unit wherein a preliminary stacking section can be effectively used and the amount of postal matter which is rejected is decreased.

In order to achieve the above object of the present invention, there is provided a sorter with an automatic discharging unit, comprising:

(a) reading means for reading sorting information assigned to paper sheets;

(b) a plurality of stacking sections vertically disposed in a plurality of rows for stacking the paper sheets therein, each of said plurality of stacking sections being provided with a discharging mechanism;

(c) sorting/stacking means for sorting/stacking the paper sheets in said plurality of stacking sections in accordance with the sorting information from said reading means;

(d) transferring means, sequentially opposing said plurality of stacking sections, for receiving the paper sheets discharged by said discharging mechanism from each of said plurality of stacking sections;

(e) a preliminary stacking section with a discharging mechanism for stacking therein paper sheets intented to be stacked in a given one of said plurality of stacking sections while the paper sheets already stacked in said given one of said plurality of stacking sections are being discharged;

(f) timer means for counting a predetermined time interval during which said preliminary stacking section opposes said given one of said plurality of stacking sections, and for producing a timeout signal when the predetermined time interval has elapsed; and (g) controlling means for receiving the timeout signal from said timer means to drive said discharging mechanism of said preliminary stacking section.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENT

Figure 1:
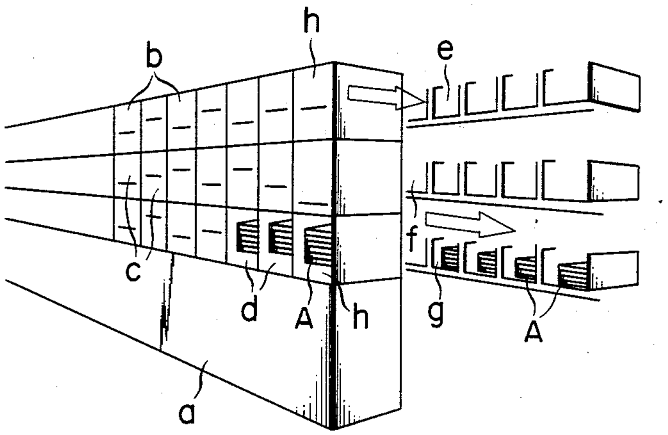
FIG. 1 (PRIOR ART)
FIG. 1 is a perspective view schematically showing the configuration of a conventional sorter with an automatic discharging unit.
Figure 2:
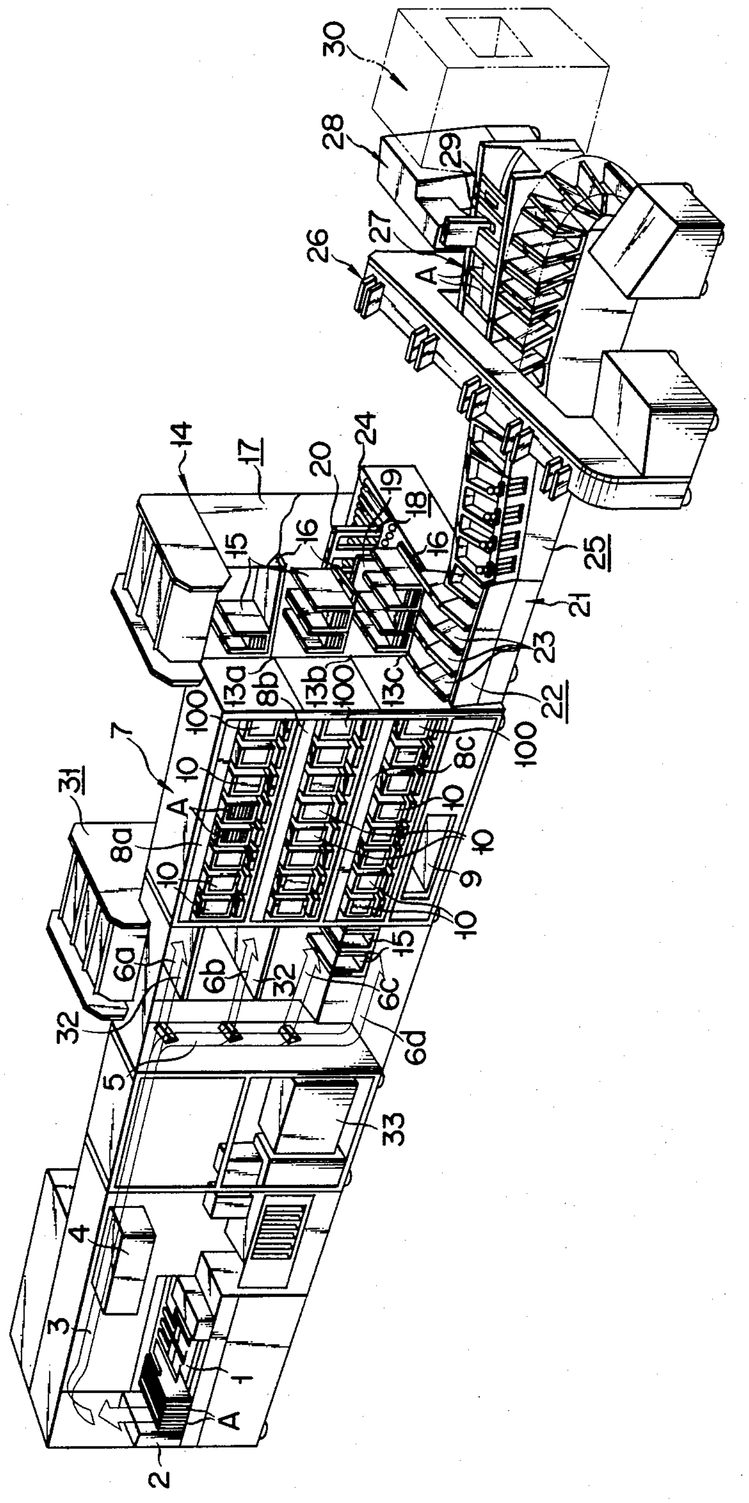
FIG. 2 is a perspective view showing a sorter with an automatic discharging unit according to an embodiment of the present invention.

The present invention will be described with reference to the accompanying drawings. FIG. 2 shows a sorter with an automatic discharging unit. Postal matter A such as postcards and envelopes stacked upright in a supply section 1 is sequentially extracted by an extracting section 2 beginning with the frontmost one. A reader 4 is disposed at the middle of a conveying path 3 to read a postal code written or printed on the postal matter A.

The postal matter A is then sorted by a gate mechanism 5 to sorting convey paths 6*a*, 6*b*, 6*c* and 6*d*, which are vertically disposed with respect to each other, in accordance with the read information from the reader 4. The postal matter A is then conveyed to sorting convey paths 8*a*, 8*b* and 8*c* or to a rejection pocket 9 of a sorting section 7 with an automatic discharging function.

The sorting section 7 has a plurality of stacking sections 10 along the lower surface of each of the conveying paths 8*a*, 8*b* and 8*c* and preliminary stacking sections 100 respectively corresponding to rows of the plurality of stacking sections 10. The postal matter A delivered to the conveying path 8*a*, 8*b* or 8*c* is sorted and stacked in a predetermined stacking section 10 in accordance with the information read by the reader 4.

When a predetermined amount of postal matter A has accumulated in a given stacking section 10 or when the operator depresses a compulsory pushout switch (not shown), a discharging mechanism (i.e., a pushout mechanism to be described later) of the stacking section 10 is operated so as to push out the stack of postal matter A therein to the rear side of the sorting section 7.

Each preliminary stacking section 100 is disposed after the last stacking section 10 in a row of stacking sections 10. After the postal matter in the corresponding stacking section 10 has been pushed out, the postal matter A in the preliminary stacking section 100 is pushed out to the rear side of the sorting section 7 by a pushout mechanism having the same arrangement as that of the stacking section 10.

A tray circulating section (transfer section) 14 has horizontal tray conveying paths 13*a*, 13*b*, and 13*c* vertically arranged therein which respectively correspond to rows of stacking sections 10 and 100. The stacks of postal matter A pushed out from each row of the stacking sections 10 and 100 are transferred to trays 15 which are sequentially and intermittently conveyed on the horizontal tray conveying paths 13*a*, 14*b* and 13*c*.

An elevator mechanism 17 is disposed at the end portions of the conveying paths 13*a*, 13*b* and 13*c*, and intermittently circulates tray tables 16, so that the tray tables 16 sequentially oppose the terminal ends of the horizontal tray conveying paths 13*a*, 13*b* and 13*c* in the specified order. The elevator mechanism 17 receives the trays 15 (including empty trays) storing stacks of the postal matter A from the conveying paths 13*a*, 13*b* and 13*c*, and conveys them to a separation section of a postal matter/tray separation mechanism 18. In this mechanism 18, a postal matter pushout plate 19 and a tray pullout plate 20 reciprocate. During the forward movement, the postal matter A is pushed out to the front side of an aligned edge converting section 23 constituting the initial end portion of a common conveying line 21. During the return movement, the empty trays 15 are pushed out in the backward direction and are delivered at the initial end position of a tray return path 24 of the tray circulating section 14.

The stack of postal matter A delivered to the convey line 21 is conveyed by an aligning conveyor unit 25 which constitutes the conveying line 21. On the intermediate portion of the conveying line 21 both the trailing ends of items of the postal matter A and one of the sides of each item of the postal matter A are respectively aligned. The aligned stack of postal matter A is transferred by a conveyor mechanism 26 to a conveying line 27 which is perpendicular to the conveying line 21. A mailing address card 29 is placed by a mailing address card issuing unit 28 on the uppermost item of the stack of postal matter A. The mailing address card issuing unit 28 opposes the conveying path 27.

The stack of postal matter A to which the mailing address card 29 is issued is delivered to a bundling unit 30 which is disposed at the terminal end of the conveying line 27. The stack of postal matter A is then bundled.

The trays 15 returned by the postal matter/tray separation mechanism 18 to the tray return path 24 are conveyed to an elevator mechanism 31 disposed at the initial ends of the horizontal tray conveying paths 8*a*, 8*b* and 8*c*. The trays 15 are then placed by a tray transfer mechanism (not shown) on tray tables 32 of the elevator mechanism 31 so as to be disposed opposite the terminal end of the tray return path 24. The elevator mechanism 31 intermittently circulates the tray tables 32 which then sequentially oppose the initial ends of the horizontal tray conveying paths 13*a*, 13*b* and 13*c* in that order. The trays 15 respectively opposing the initial ends of the horizontal tray conveying paths 13*a*, 13*b* and 13*c* are pushed one at a time by a push-in mechanism (not shown) into the horizontal tray conveying paths 13*a*, 13*b*, and 13*c*. The tray 15 in each of the horizontal tray conveying paths 13*a*, 13*b* or 13*c* is conveyed by one pitch. The last tray is then placed on the tray table 16 of the elevator mechanism 17.

Figure 3:
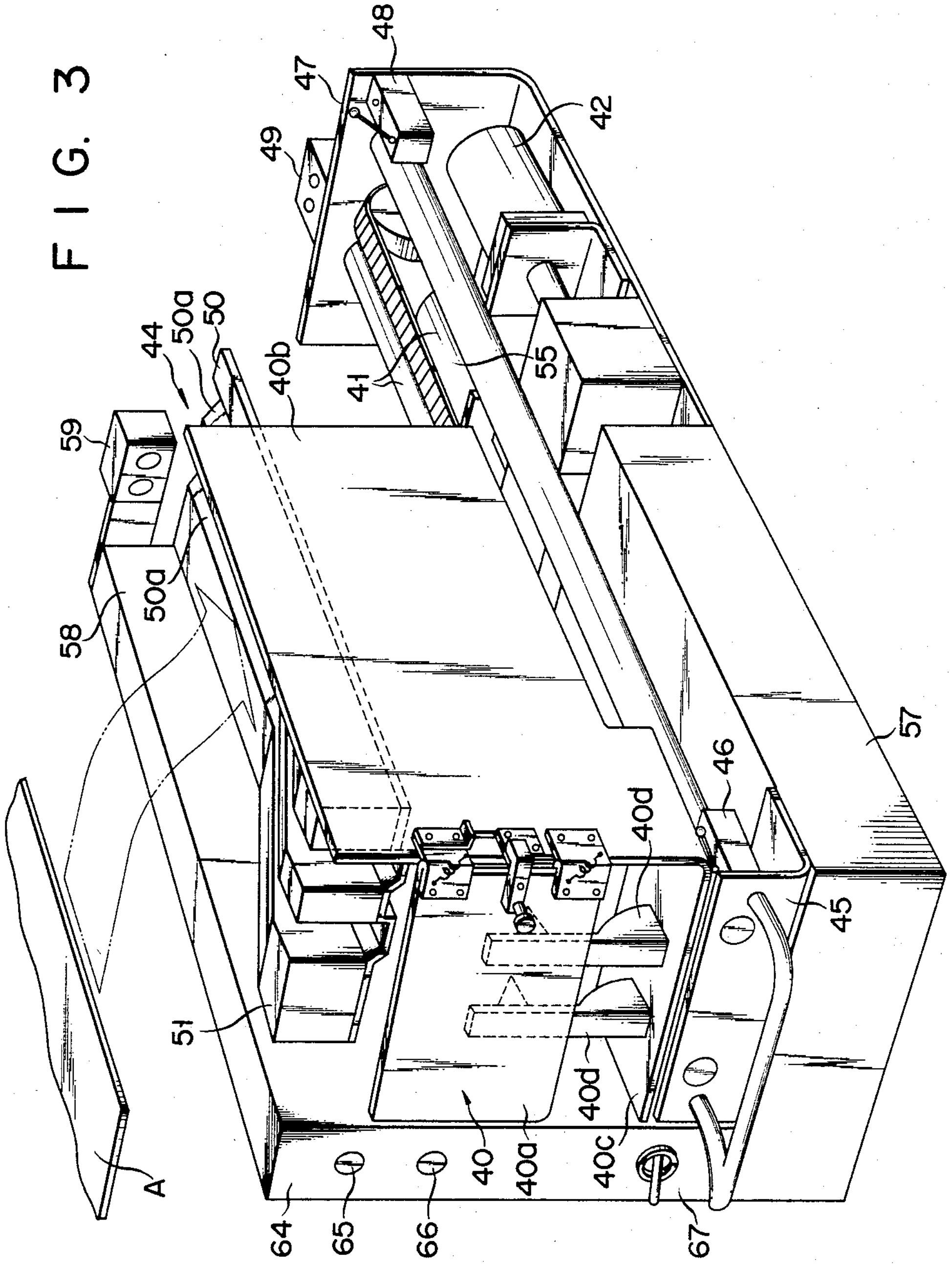
FIGS. 3 and 4 are perspective views showing a stacking section.
Figure 4:
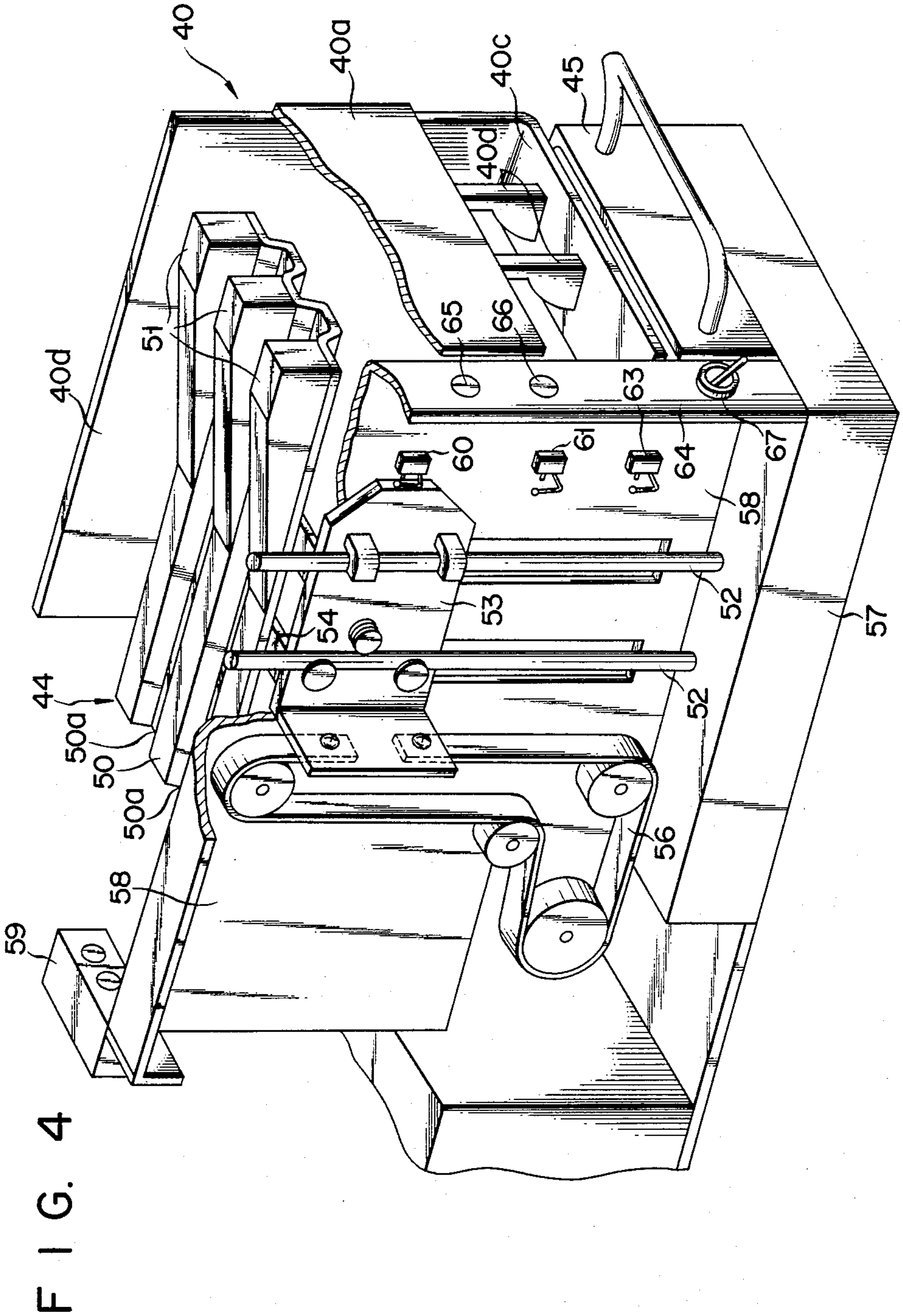

The stacking section 10 and the preliminary stacking section 100 will now be described in detail with reference to FIGS. 3 and 4. A pushout section 40 comprises a pushout plate 40*a* which also serves as a front cover, a side plate 40*b*, a bottom plate 40*c*, and a tilt support member 40*d*. The bottom plate 40*c* is reciprocally carried on guide rails 41. A belt 43 which has a pushout section drive pulse motor 42 as a drive source is connected to the bottom plate 40*c* of the pushout section 40. When the pulse motor 42 is rotated in the forward/reverse direction, the pushout section 40 reciprocates along a receiving table 44. A stop-position detector 46 is arranged in the vicinity of one plate 45 which supports the guide rails 41 so as to detect whether the pushout section 40 is at a stop position (stack position of the postal matter A). A return-position detector 48 is arranged in the vicinity of the other plate 47 which supports the guide rails 41 so as to detect whether or not the pushout section 40 is located at a return position (pushout completion position). The position detectors 46 and 48 are turned on/off by a projection (not shown) formed on the bottom plate 40*c* of the pushout section 40 so as to detect the current position of the pushout section 40. An empty-stack detector 49 is arranged on the side of the plate 47 opposite the guide rails 41 so as to detect whether or not postal matter A has been transferred onto the tray 15. The empty-stack detector 49 comprises, for example, a light-emitting element and a photosensor.

The table 44 comprises a plate 50 which has guide grooves 50*a* for guiding the tilt support member 40*d* along substantially the center of the table 44 and a title member 51 which is an upper portion thereof which excludes the guide grooves 50*a* of the plate 50 and which is disposed on the side of the pushout plate 40*a*. It should be noted that the postal matter A conveyed from the conveying paths 8*a*, 8*b* and 8*c* is placed on the table 44. The table 44 is mounted on crosspieces 54 which are fixed on a carriage 53 which is raised/lowered along guide rails 52. A belt 56 which has a carriage drive pulse motor 55 as a drive source is connected to the carriage 53. When the pulse motor 55 is rotated in the forward/reverse direction, the table 44 is moved vertically. A control circuit 57 is arranged below the pushout section 40 to control the overall operation of the stacking sections 10.

A side plate 58 is disposed above the control circuit 57 so as to oppose the side plate 40*b* of the pushout section 40. A postal matter detector 59 is disposed at the upper portion of the side plate 58 so as to detect the postal matter A placed on the table 44. The detector 59 comprises, for example, a limited reflection type detector which has a light-emitting element and a photosensor. An upper limit detector 60, a pushout permission/full-stack detector 61, and a lower limit detector 63 are disposed on the side plate 58 so as to detect the position of the table 44 in accordance with movement of the carriage 53. The upper limit detector 60 detects whether or not the table 44 is located at the upper limit (initial state). The pushout permission/full-stack detector 61 detects whether or not the stacked postal matter can be pushed out (discharged) and whether or not the postal matter fills the table 44. The lower limit detector 63 detects whether or not the table 44 is located at the lower limit (pushout position). The detectors 46, 48, 60, 61 and 63 comprise, for example, microswitches, so they will be referred to as switches hereinafter.

An end plate 64 disposed at one of the edges of the side plate 58 is bent to be parallel to the pushout plate 40*a* of the pushout section 40. An in-operation indicator 65 for indicating the ready and in-operation states of the stacking sections 10 or the preliminary stacking sections 100, an abnormality indicator 66 for indicating a jam or an abnormal stacking state, and a receiving table up-down switch 67 (toggle switch) for switching the vertical movement of the table 44 are arranged on the end plate 64.

Figure 5:
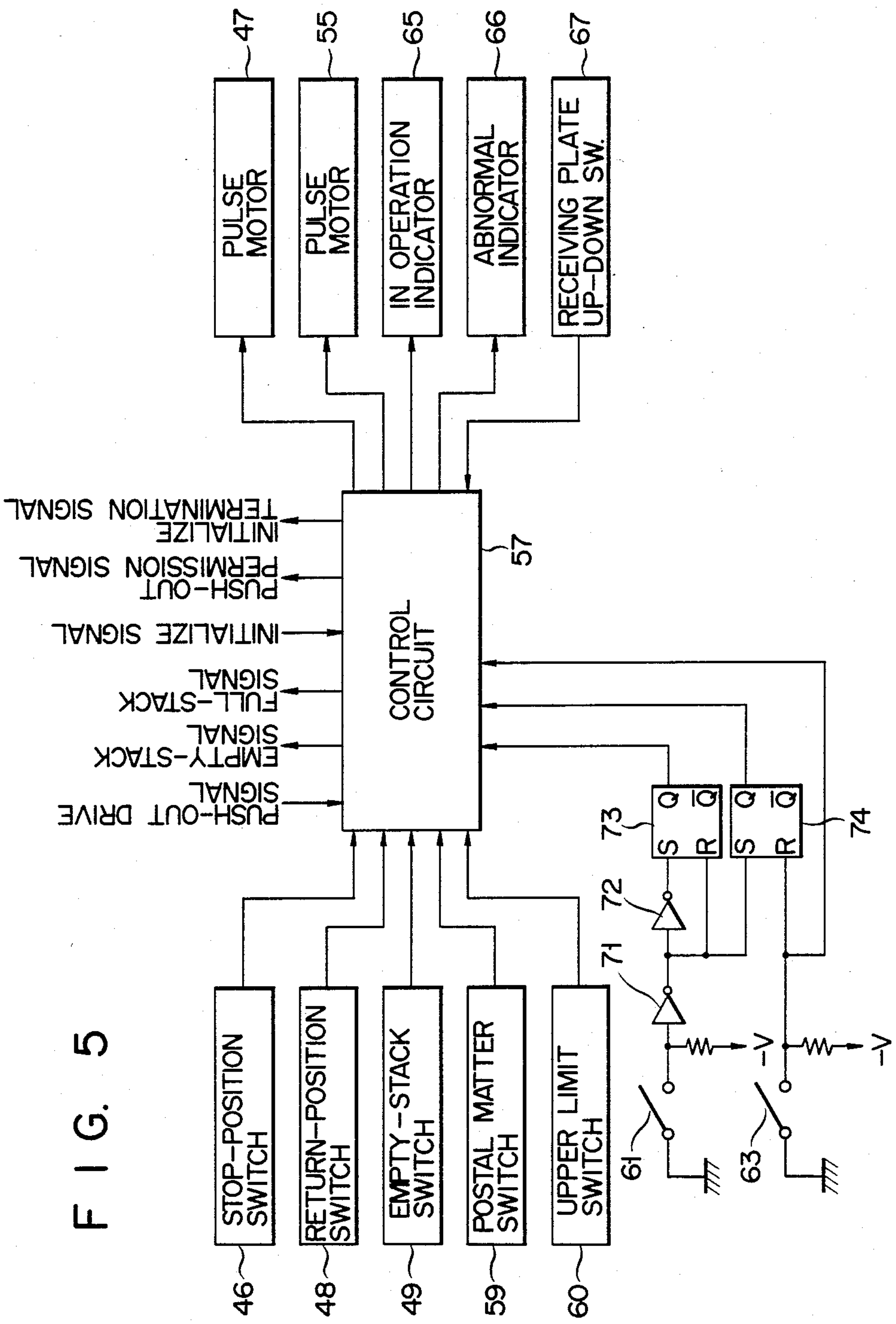
FIG. 5 is a block diagram of an electrical circuit of a stacking section.

An electrical circuit for each of the stacking sections 10 and the preliminary stacking sections 100 is arranged as shown in FIG. 5.

The control circuit 57 serves to drive the motor 55 in the forward direction in accordance with a detected signal from the postal matter switch (detector) 59, so that the table 44 is moved downward for a distance corresponding to a total thickness of the postal matter stack. The control circuit 57 produces a pushout permission signal, a full-stack signal, and an empty-stack signal to a control section 33. The pushout permission signal is produced in accordance with the set output from a flip-flop (F/F) 73 to be described later. The full-stack signal is produced in accordance with the set output from the flip-flop 74. The empty-stack signal is produced in accordance with the detection signal from the empty-stack switch (detector) 49.

The control circuit 57 causes the motor 55 to rotate in the forward direction in accordance with a pushout drive signal from the control section 33, so that the table 44 is moved downward. The motor 42 is rotated in the forward direction in accordance with a detection signal from the lower limit detector 63 so as to reciprocate the pushout section 40.

Furthermore, the control circuit 57 causes the motor 55 to rotate in the reverse direction after the control circuit 57 receives the detection signal from the return-position detector 48 until it receives the detection signal from the upper limit detector 60. As a result, the table 44 is moved upward to the initial position. The control circuit 57 also causes the motor 42 to rotate in the reverse direction after the control circuit 57 receives the detection signal from the return-position detector 48 until it receives the detection signal from the stop-position detector 46. As a result, the pushout section 40 is moved downward to the predetermined position.

The control circuit 57 sets the table 44 and the pushout section 40 to their initial positions in accordance with an initialize signal from the control section 33. When the table 44 and the pushout section 40 are set in their initial positions, the control circuit 57 supplies an initialize termination signal to the control section 33. The control circuit 57 comprises a microcomputer. This microcomputer comprises, for example, an 8-bit microcomputer TMM8085 manufactured by Toshiba Corporation.

An output signal from the pushout permission/full-stack detector 61 is supplied to the set input end of a flip-flop (F/F) 73 through inverters 71 and 72. An output signal from the inverter 71 is supplied to the reset input end of the flip-flop 73. The output signal from the inverter 71 is also supplied to the set input end of the flip-flop 74. An output signal from the lower limit detector 63 is supplied to the reset input end of the flip-flop 74. The set output signal from the flip-flop 73 is supplied to the control circuit 57 to be a signal which indicates the postal matter pushout (discharge) enable signal. The set output signal from the flip-flop 74 is supplied to the control circuit 57 to be a signal which indicates the full state of the table 44.

Figure 6:
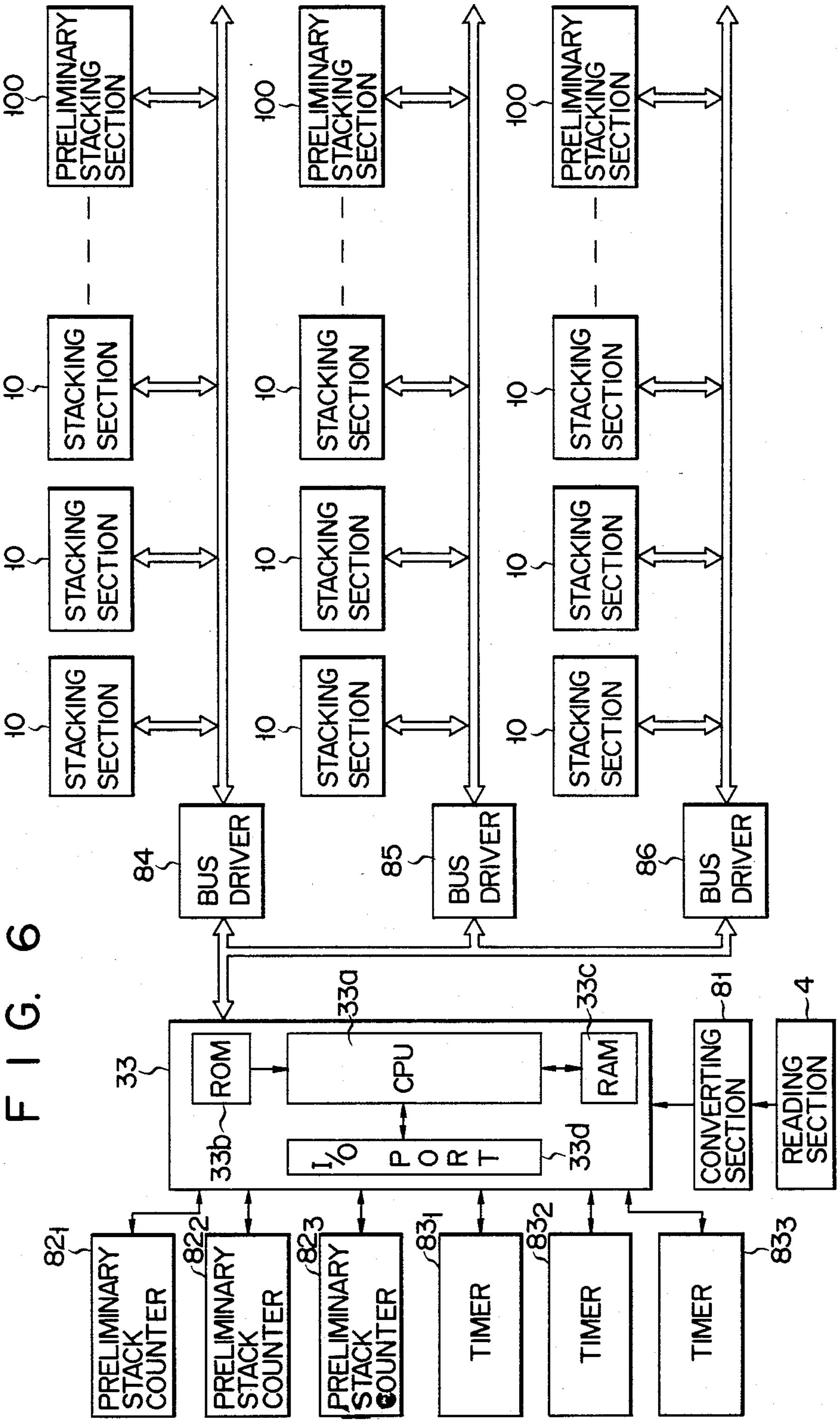
FIG. 6 is a block diagram of an overall electrical circuit.

FIG. 6 shows a circuit diagram of the overall system. A converting section 81 converts the read result (postal code) from the reader 4 to a sorting code of a corresponding sorting section 10. An output signal from the converting section 81 is supplied to the control section 33. Various signals (i.e., the pushout permission signal, the full-stack signal, the initialize termination signal and the empty-stack signal) from the stacking sections 10 and the preliminary stacking sections 100 are supplied to the control section 33. The control section 33 determines that the apparatus is set in the pushout permission state in accordance with the pushout permission signal. The control section 33 determines that the table 44 is full in accordance with the full-stack signal. When the control section 33 receives the empty-stack signal from a stacking section 10, the control section 33 supplies a pushout drive signal to the stacking section and performs sorting control of the postal matter A in accordance with the corresponding sorting code. When the control section 33 receives the corresponding sorting code while the corresponding stacking section 10 is subject to pushout operation, the subsequent postal matter A is stacked in the corresponding preliminary stacking section 100. When a predetermined amount of postal matter A (e.g., 10 items) is stacked in the preliminary stacking section, that is, when signals are supplied from counters 82$_1$, 82$_2$ and 82$_3$ to the control section 33, or when the timeout signals are supplied from timers 83$_1$, 83$_2$ and 83$_3$ thereto, the control section 33 supplies the pushout drive signal to the corresponding preliminary stacking section 100. The counters 82$_1$ through 82$_3$ count the number of items of postal matter A delivered to the preliminary stacking sections 100, respectively. More particularly, the timers 83$_1$ through 83$_3$ correspond to the preliminary stacking sections 100, respectively, and each of the timers 83$_1$ to 83$_3$ produces the timeout signal when a predetermined time interval (e.g., 30 seconds) has elapsed after a start time.

When a sorting start key (not shown) is depressed, the control section 33 produces and supplies the initialize signal to the uppermost row of stacking sections 10 and the corresponding preliminary stacking section 100. The control section 33 then supplies the initialize signal to the intermediate row of stacking sections 10 and its corresponding preliminary stacking section 100 after receiving initialize termination signals from the sections 10 and 100 of the uppermost row. Subsequently, the control section 33 supplies the initialize signal to the lowermost row of stacking sections 10 and its corresponding preliminary stacking section 100 after receiving initialize termination signals from the sections 10 and 100 of the intermediate row. When the initialize termination signals are received from the lowermost row of stacking sections 10 and 100, the control section 33 allows the extraction operation by the extracting section 2. The stacking sections 10 and the corresponding preliminary stacking section 100 which belong to the respective rows are connected to the control section 33 through bus drivers 84, 85 and 86, respectively. The control section 33 comprises a microcomputer having a CPU 33*a*, a ROM 33*b*, a RAM 33*c* and an I/0 port 33*d*. The microcomputer comprises a 16-bit microprocessor Z-8002 manufactured by Advanced Micro Devices, Inc.

The operation of a sorter with the automatic discharging unit according to the embodiment of the present invention will be described hereinafter.

The postal matter A which is set in the supply section 1 is sequentially extracted therefrom by the extracting section 2 and is conveyed along the conveying path 3. The postal codes of the postal matter A are read at the intermediate portion of the convey path 3. Each postal code is converted by the converting section 81 to a sorting code. The sorting code is then supplied to the control section 33. The control section 33 performs sorting to selectively deliver items of the postal matter A having the sorting codes so as to correspond to the respective stacking sections 10. Thereafter, items of postal matter A are sorted in accordance with their postal codes into stacking sections 10 having corresponding sorting codes.

In this manner, when the postal matter A is stacked in a predetermined stacking section 10 and a predetermined amount of postal matter A has accumulated on the table 44, the detector 59 detects the postal matter A. The control circuit 57 causes the motor 55 to be driven in the forward direction in accordance with the detection signal from the detector 59 so as to move the table 44 downward by a distance corresponding to the thickness of the stack of postal matter A. Every time the postal matter A is supplied, this lowering operation is repeated. When a plurality of items of postal matter A have been supplied to the table 44 so as to render it full, the table 44 is moved downward to a pushout permission position. In this condition, the detector 61 is turned on and the flip-flop 73 is set. The control circuit 57 then produces a pushout permission signal in response to the set output signal from the flip-flop 73.

As a result, when the control section 33 receives the full-stack signal from the control section 57 of the stacking section 10, the control section 33 produces a pushout drive signal to the corresponding stacking section 10. The control section 57 then causes the motor 55 to drive in the forward direction to move the table 44 downward. The detection signal from the lower limit detector 63 causes the motor 55 to stop and the motor 42 to drive in the forward direction. Therefore, the pushout section 40 can reciprocate along the longitudinal direction of the table 44. The stack of postal matter A is then pushed out by the pushout plate 40*a* to the rear side of the sorting section 7 and is transferred to the tray 15. When this transfer operation is completed, the detector 48 is turned on by the projection on the bottom plate 40*c* of the pushout section 40. When the detector 48 supplies a detection signal to the control circuit 57, the control circuit 57 causes the motor 55 to drive in the reverse direction, so that the table 44 is moved upward and the motor 42 is driven in the reverse direction. As a result, the pushout section 40 reciprocates along the longitudinal direction of the table 44. Thereafter, when the table 44 reaches the initial position, the upper limit detector 60 detects the initial position, and the motor 55 is stopped. When the pushout section 40 is located at the initial position, the detector 46 is turned on by the projection on the bottom plate 40*c* of the pushout section 40, so that the detector 46 supplies a detection signal to the control circuit 57. The control circuit 57 then causes the motor 42 and the pushout section 40 to stop.

Assume that the pushout drive signal is not produced by the control section 33 during the ON period of the detector 61. When the detector 61 is turned off, the flip-flop 74 is set, and the control circuit 57 produces a full-stack signal.

When a full-stack signal from the control circuit 57 of the stacking section 10 is supplied to the control section 33, the control section 33 supplies a pushout drive signal to the corresponding stacking section 10. In this stacking section 10, the motor 55 is rotated in the forward direction under the control of the control section 57, so that the table 44 is moved downward. The subsequent operation is the same as in the case wherein the postal matter A is stacked in the stacking section 10 prior to the full state. When the stacking section 10 is filled with postal matter A, the postal matter A is transferred to the corresponding tray 15. While this stacking section 10 completes the pushout operation and restores the stacking permission state, the postal matter A corresponding to this stacking section 10 is stacked therein.

When the postal matter in a stacking section 10 in the uppermost row is pushed out, that is, when the pushout drive signal is supplied from the control section 33 to this row of stacking sections, the control section 33 causes the timer $83_1$ to start and supplies the start signal to the control circuit 57 of the preliminary stacking section 100. The control circuit 57 then causes the in-operation indicator 65 to turn on.

When subsequent postal matter having a sorting code corresponding to that of the stacking section 10 is supplied, the control section 33 causes the postal matter A to be delivered to the preliminary stacking section 100 located in the same row as the above-mentioned stacking section 10.

Every time subsequent postal matter having a sorting code corresponding to that of the stacking section which is performing the pushout operation is supplied, the count of the counter $82_1$ is increased.

Thereafter, when the count of the counter $82_1$ reaches 10 (i.e., the counter $82_1$ produces the signal which indicates the count of "10") or when the timeout signal is produced by the timer $83_1$, and when the empty-stack signal is supplied from the control circuit 57 of the preliminary stacking section 100, the control section 33 supplies the pushout drive signal to the uppermost preliminary stacking section 100. The control circuit 57 causes the motor 55 to be driven in the forward direction so as to move the table 44 downward. The detection signal from the lower limit detector 63 causes the motor 55 to stop and the motor 42 to be driven in the forward direction. As a result, the pushout section 40 can reciprocate along the longitudinal direction of the table 44. The postal matter A is then pushed out by the pushout plate 40*a* to the rear side of the sorting section 7 and is transferred to the tray 15. When this transfer operation is completed, the detector 48 is turned on by the projection formed on the bottom plate 40*c* of the pushout section 40. The detection signal from the detector 48 is then supplied to the control circuit 57. The control circuit 57 causes the motor 55 to be driven in the reverse direction so as to move the table 44 upward. The control circuit 57 also causes the motor 42 to be driven in the reverse direction to reciprocate the pushout section 40 along the longitudinal direction of table 44. Thereafter, when the detector 60 is turned on, the control circuit 57 determines that the table 44 is located at the initial position and causes the motor 55 to stop. When the detector 46 is turned on by the projection on the bottom plate 40*c* of the pushout section 40, the control section 57 determines that the pushout section is located at the initial position in response to the detection signal from the detector 46, thereby stopping the motor 42.

When the table 44 and the pushout section 40 are set at their initial positions, the control circuit 57 causes the in-operation indicator 65 to turn off. The control circuit 57 also supplies the in-operation signal (initialize termination signal) to the control section 33. The control section 33 then clears the contents of the counter $82_1$ and the timer $83_1$.

While the intermediate and lowermost rows of stacking sections 10 are subject to the pushout operation, the intermediate and lowermost preliminary stacking sections 100 are used to perform preliminary stacking.

When the operation time of the preliminary stacking section is limited, as described above, no single stacking section may occupy the corresponding preliminary stacking section for a long period of time, thereby decreasing the amount of postal matter which is rejected. Furthermore, when the preliminary stacking section is in use, the in-operation indicator arranged for the preliminary stacking section is ON. The operator can immediately judge whether or not the corresponding preliminary stacking section is being operated. The operator can judge whether or not to insert his hand in the preliminary stacking section, thereby locating the erroneous sorting.

In the above embodiment, the timers and the counters are arranged in the electrical circuit of the overall system. However, they may be arranged in the respective preliminary stacking sections. In the above embodiment, the pushout operation of the preliminary stacking section is performed in accordance with the counts of the counters and the timeout signals from the timers. However, the pushout permission signal is used to perform the pushout operation so as to obtain the same effect as in the above embodiment.

What is claimed is:

1. A sorter with an automatic discharging unit, comprising:

(a) reading means for reading sorting information assigned to paper sheets;

(b) a plurality of stacking sections vertically disposed in a plurality of rows for stacking the paper sheets, each of said plurality of stacking sections being provided with a discharging mechanism;

(c) sorting/stacking means for sorting/stacking the paper sheets in said plurality of stacking sections in accordance with the sorting information from said reading means;

(d) transferring means, sequentially opposing said plurality of stacking sections, for receiving the paper sheets discharged by said discharging mechanism from each of said plurality of stacking sections;

(e) a preliminary stacking section with a discharging mechanism for stacking therein paper sheets intended to be stacked in a given one of said plurality of stacking sections while the paper sheets already stacked in said given one of said plurality of stacking sections are being discharged;

(f) timer means for counting a predetermined time interval during which said preliminary stacking section opposes said given one of said plurality of stacking sections, and for producing a timeout signal when the predetermined time interval has elapsed; and (g) controlling means for receiving the timeout signal from said timer means to drive said discharging mechanism of said preliminary stacking section.

2. A sorter with an automatic discharging unit, comprising:

(a) reading means for reading sorting information assigned to paper sheets;

(b) a plurality of stacking sections vertically disposed in a plurality of rows for stacking the paper sheets, each of said plurality of stacking sections being provided with a discharging mechanism;

(c) sorting/stacking means for sorting/stacking the paper sheets in said plurality of stacking sections in accordance with the sorting information from said reading means;

(d) transferring means, selectively opposing one of said plurality of stacking sections, for receiving the paper sheets discharged by said discharging mechanism from each of said plurality of stacking sections;

(e) a preliminary stacking section with a discharging mechanism for stacking therein paper sheets intended to be stacked in a given one of said plurality of stacking sections while the paper sheets already stacked in said given one of said plurality of stacking sections are being discharged;

(f) timer means for counting a predetermined time interval during which said preliminary stacking section opposes said given one of said plurality of stacking sections, and for producing a timeout signal when the predetermined time interval has elapsed;

(g) counting means for counting the paper sheets stacked in said preliminary stacking section and for producing a count signal when a count of said counting means reaches a predetermined number; and (h) controlling means for receiving the timeout signal from said timer means and the count signal from said counting means to drive said discharging mechanism of said preliminary stacking section.

3. A sorter according to claim 1, wherein said controlling means comprises a programmable microprocessor connected to said timer means and said preliminary stacking section, said microprocessor comprising a central processing unit for receiving the timeout signal from said timer means, and a read-only memory for storing a permanent program for a function of said central processing unit so that said controlling means executes a specific operation wherein said timer means and said preliminary stacking section are controlled to drive said discharging mechanism of said preliminary stacking section in accordance with the timeout signal from said timer means when a predetermined time interval corresponding to an operating time of said preliminary stacking section with respect to said given one of said plurality of said stacking sections has elapsed.

4. A sorter according to claim 2, wherein said controlling means comprises a programmable microprocessor connected to said timer means, said counter means and said preliminary stacking section, said microprocessor comprising a central processing unit for receiving the timeout signal from said timer means and a read-only memory for storing a permanent program for a function of said central processing unit so that said controlling means executes a specific operation, wherein said timer means, said counter means and said preliminary stacking section are controlled to drive said discharging mechanism of said preliminary stacking section in accordance with the timeout signal from said timer means or the count signal from said counter means when a predetermined time interval corresponding to an operating time of said preliminary stacking section with respect to said given one of said plurality of said stacking sections has elapsed or when the number of paper sheets stacked in said preliminary stacking section reaches a predetermined number.

5. A sorter according to claim 1, wherein said controlling means resets said timer means when said discharging mechanism of said preliminary stacking section is driven.

6. A sorter according to claim 2, wherein said controlling means resets said timer means and said counter means when said discharging mechanism of said preliminary stacking section is driven.

7. A sorter according to claim 3, wherein said controlling means resets said timer means when said discharging mechanism of said preliminary stacking section is driven.

8. A sorter according to claim 4, wherein said controlling means resets said timer means and said counter means when said discharging mechanism of said preliminary stacking section is driven.

9. A sorter according to claim 1, wherein said preliminary stacking section has indicator means for indicating that said preliminary stacking section is being operated.

10. A sorter according to claim 2, wherein said preliminary stacking section has indicator means for indicating that said preliminary stacking section is being operated.

11. A sorter according to claim 3, wherein said preliminary stacking section has indicator means for indicating that said preliminary stacking section is being operated.

12. A sorter according to claim 4, wherein said preliminary stacking section has indicator means for indicating that said preliminary stacking section is being operated.

13. A sorter according to claim 5, wherein said preliminary stacking section has indicator means for indicating that said preliminary stacking section is being operated.

14. A sorter according to claim 6, wherein said preliminary stacking section has indicator means for indicating that said preliminary stacking section is being operated.

15. A sorter according to claim 7, wherein said preliminary stacking section has indicator means for indicating that said preliminary stacking section is being operated.

16. A sorter according to claim 8, wherein said preliminary stacking section has indicator means for indicating that said preliminary stacking section is being operated.

* * * * *